Dec. 9, 1958  B. E. PETERSON  2,863,357
METHOD FOR ASSEMBLY OF CUSHIONING DEVICES
Original Filed Oct. 19, 1954  3 Sheets-Sheet 1
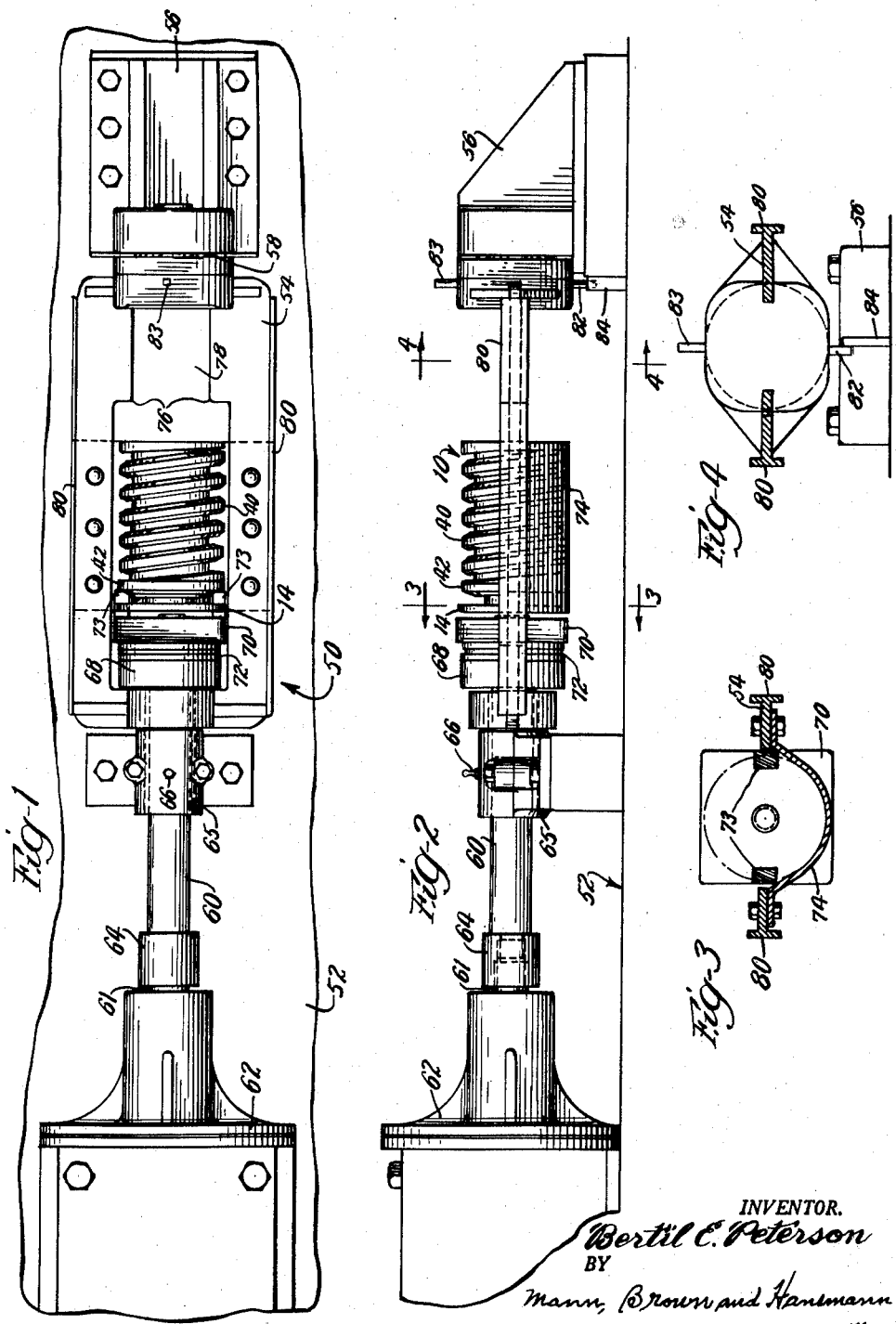
INVENTOR.
Bertil E. Peterson
BY
Mann, Brown and Hanemann
Attys.

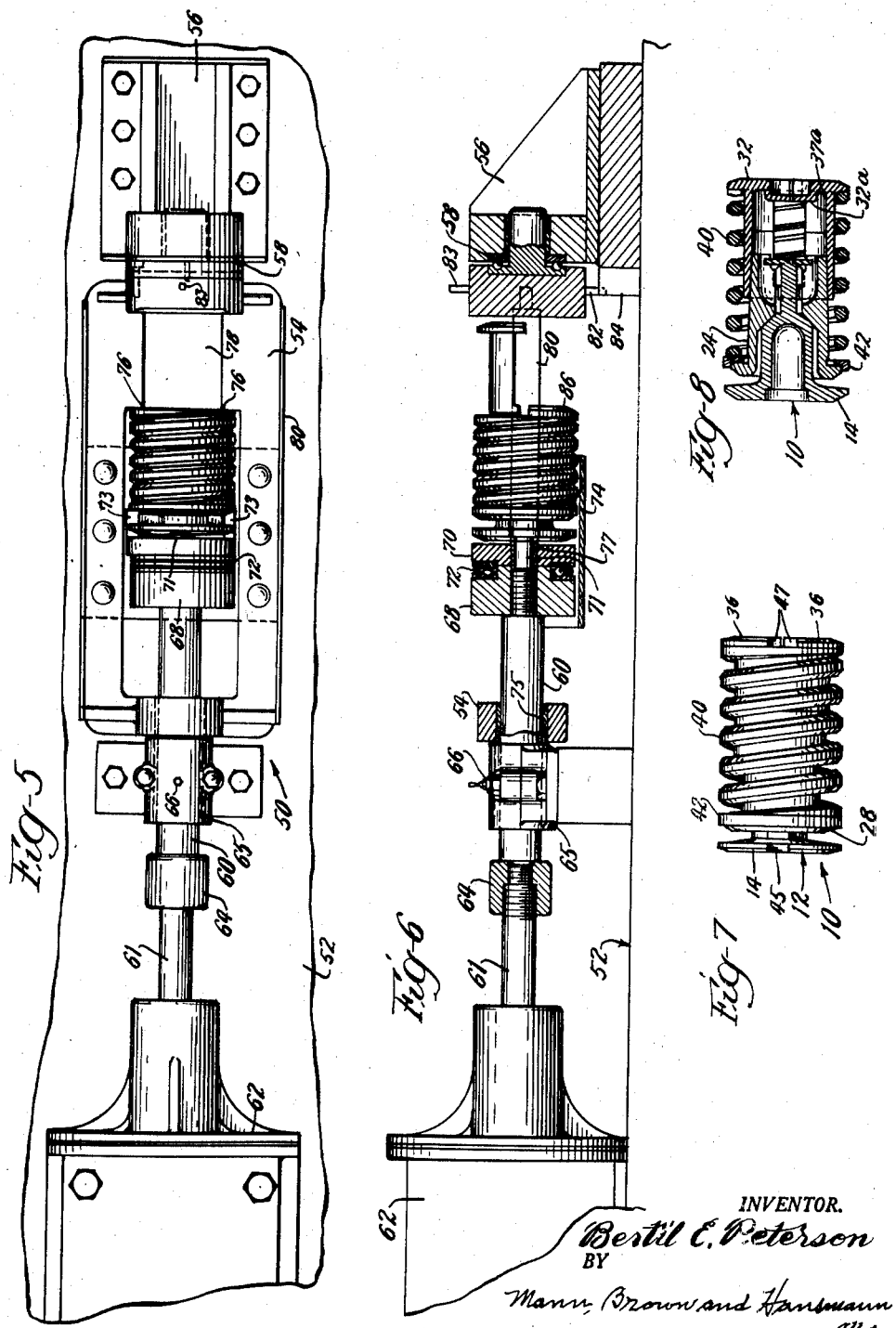

Dec. 9, 1958  B. E. PETERSON  2,863,357
METHOD FOR ASSEMBLY OF CUSHIONING DEVICES
Original Filed Oct. 19, 1954  3 Sheets-Sheet 3

INVENTOR.
Bertil E. Peterson
BY
Mann, Brown and Hansmann
Attys.

United States Patent Office 2,863,357
Patented Dec. 9, 1958

2,863,357
METHOD FOR ASSEMBLY OF CUSHIONING DEVICES

Bertil E. Peterson, Chicago, Ill., assignor to Cardwell Westinghouse Company, a corporation of Delaware Original application October 19, 1954, Serial No. 463,163. Divided and this application September 12, 1955, Serial No. 533,721

1 Claim. (Cl. 29—446)

The present invention relates to a method for assembly of cushioning devices used in railway cars or the like, and more particularly to the type of cushioning device disclosed and claimed in copending application Serial Number 463,166, filed October 19, 1954, now Patent No. 2,789,810, and assigned to the assignee of the present application.

The cushioning device of the above mentioned application comprises a friction post having a base and a generally flat post on the base having opposed wedge surfaces, friction shoes having inner wedge surfaces engaging the opposed wedge faces of the post and outwardly directed bottom flanges, friction members engaging the outer sides of the friction shoes and having outwardly directed top flanges, a helical spring around the friction members and friction shoes, a spring seat adjacent the friction shoes, and interengaging lugs or shoulders on said friction post and said friction members for holding the device in assembled relation. The device is assembled by loosely placing the friction shoes on the friction post, dropping the spring seat around the friction shoes and then dropping the spring about the shoes, compressing the spring, and inserting the friction members to engage the lugs or shoulders thereof with the lugs or shoulders of the friction post. The base of the friction post is slotted and the edges of the top flanges of the friction members are cut back for application of pressure directly against the spring seat to compress the spring during assembly of the device; the inner ends of the friction shoes are conventionally notched to avoid interference with the post and friction members under extraordinary loads while in service and these notches avoid interference with any compressing structures as the inner ends of the friction shoes move outwardly of the spring as the spring is pressed solid. Upon release of the spring, the device is held in normal assembled position by the interengaging lugs or shoulders.

The principal object of the present invention is to provide a novel method for expeditious assembly of cushioning devices similar to that described in the aforementioned application.

My copending application Serial Number 463,163, filed October 19, 1954, now Patent No. 2,789,810 discloses apparatus particularly adapted for ready assembly of cushioning devices similar to that described in the first mentioned application. In accordance with the invention described in my said copending application, I provide a horizontally disposed yoke or cradle rotatably supported at one end thereof on a fixed bracket and rotatably supported at the other end thereof on a reciprocable power or pressure rod. The cradle or yoke includes a carrier in which the spring to be compressed may be positioned, and a pair of shoulders or abutments separated by a working space. The reciprocable rod carries a power or pressure head adapted to bear against the spring of the aforementioned class of devices to press same against the shoulders or abutments, and the power or pressure head and the rotatable support of said one end include anti-friction thrust bearings to allow rotation of the cradle or yoke after the spring is pressed solid.

In practicing my herein described method in connection with the apparatus described in my said copending application, the sub-assembly of, for instance, the device of the first mentioned application, including the friction post, the friction shoes, the helical spring and the spring seat, is horizontally disposed on said carrier, with the base of the friction post adjacent the power or pressure head, and the power or pressure head is actuated to press the spring against the shoulders until it is solid. One of the friction members may then be inserted through the working space between the shoulders or abutments, and the cradle or yoke is rotated 180 degrees whereupon the other friction member may be inserted. The yoke or cradle may then be returned to its original position and the spring released whereupon the elements of the cushioning device assume their normal assembled position.

It will be appreciated that the method herein disclosed provides substantial advantages over prior practices. For instance, a cushioning device of the type referred to hereinbefore may be easily and safely assembled in a minimum of time by a relatively inexperienced worker.

Other objects and advantages of the present invention will become apparent in the following description of the method, and a preferred embodiment of the apparatus of the present invention, in which:

Figure 1 is a plan view of a preferred embodiment of the apparatus comprising the present invention, showing a sub-assembly of a cushioning device positioned therein before compression of the spring thereof;

Figure 2 is a front elevational view of the apparatus shown in Figure 1;

Figure 3 is a cross-sectional view along line 3—3 of Figure 2, with the cushioning device removed from the apparatus;

Figure 4 is a cross-sectional view along line 4—4 of Figure 2;

Figure 5 is a view similar to Figure 1 showing the spring in compressed position;

Figure 6 is a view similar to Figure 2 showing the spring in compressed position, indicating in solid lines the approximate position of a friction member about to be inserted into the cushioning device;

Figure 7 is an elevational view of a cushioning device adapted to be assembled by the herein disclosed apparatus and method, showing the device in assembled condition;

Figure 8 is a cross-sectional view of the device shown in Figure 7; and

Figure 9:
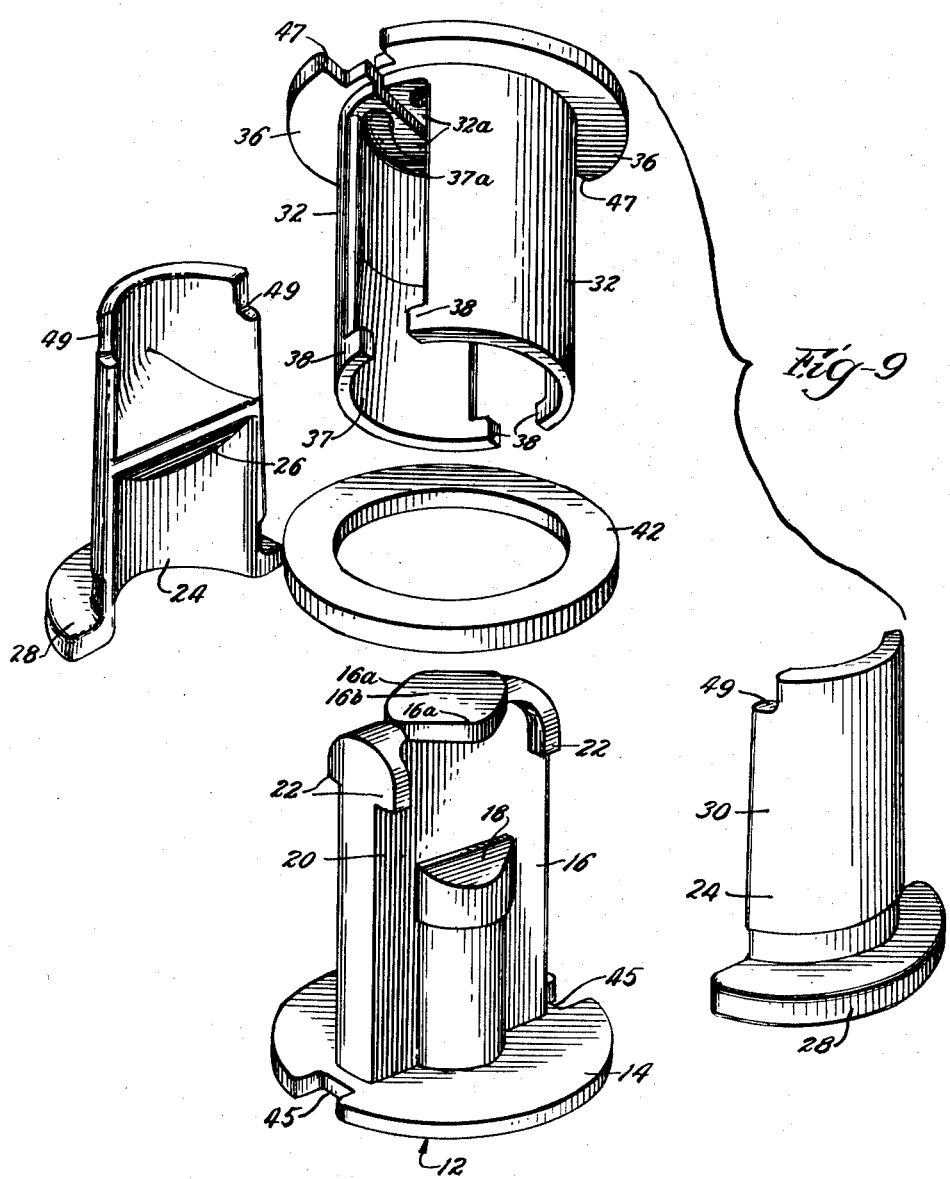
Figure 9 is an exploded perspective view of several elements of said cushion device.

Referring first more particularly to Figures 7, 8 and 9, wherein a cushioning device of the type adapted to be assembled by the hereinafter described apparatus and method is briefly illustrated for a better understanding of the invention, the cushioning device generally indicated by reference numeral 10 may take the form of the cushioning device disclosed and claimed in said aforementioned application and comprises, for instance, a thrust post or friction post 12 including a base 14 and a generally flat post 16 on the base. Inclined opposed wedge surfaces 18 are formed in the intermediate flat surfaces 20, and a pair of overhanging shoulders or lugs 22 project outwardly from each of the intermediate surfaces 20. The shoulders or lugs 22 projecting from each surface 20 are positioned at each side of the respective surfaces, that is, at the upper corners of the post 16, and it will be noted that the shoulders of the respective surfaces 20 are oppositely directed. The upper end of the post 12 may be formed with laterally extending flanges 16a providing a relatively flat bearing surface 16b at the top of the post.

Associated with the friction post 10 are a pair of friction shoes 24, each having an inner wedge surface 26 adapted for frictional contact with the corresponding wedge face or surface 18 on the post 12, an outwardly directed bottom flange 28, and an outer tapered circular surface or wall 30.

On the outer side of the friction shoes 24 are a pair of friction members 32 in frictional contact with the outer circular walls 30 of the friction shoes. Each friction member 32 is formed with an outwardly directed top flange 36 at the upper end thereof, an inner circular surface or wall 37 partially tapered and merging into a groove 37a adjacent the upper end thereof, and a pair of laterally directed lugs 38 at the lower end thereof adapted to cooperate and engage with the overhanging shoulders 22 on the friction post 12.

A helical spring generally indicated at 40 surrounds the friction members and friction shoes and extends between the outwardly directed bottom flanges 28 on the shoes and the outwardly directed top flanges 36 on the friction members, there being a spring seat 42 between the lower end of the spring 40 and the flanges on the friction shoes.

In assembling the parts shown in Figure 9, together with the spring 40, the friction shoes are set loosely on the friction post 12 and the spring seat 42 is dropped over them. The spring 40 is then telescoped over the friction shoes and compressed to allow insertion and proper positioning of friction members 32. The lower surfaces 32a of the dished-out or recessed portions of the friction members are adapted to contact and bear against the upper surface 16b of the top of the post under extreme load conditions, the shoes 24 conventionally being notched as at 49 to provide clearance for flanges 16a and avoid interference with the respective friction members 32 when the inner ends of the shoes enter grooves 37a.

As disclosed in said aforementioned application, the base 14 should be slotted or notched as at 45 and the edges of flanges 36 should be cut back as at 47 so that the spring 40 may be compressed by pressure applied directly to it. The notches 49 of shoes 24 avoid interference of the inner ends of the shoes 24 with any compressing structures as the inner ends of the shoes are forced outwardly of the spring upon compression thereof.

It will be appreciated that the major problem of assembly of the device 10 is the compression of high strength compression spring 40 so that the lugs 38 of the friction members 32 may be placed in engagement with the shoulders 22 of the friction post 12.

Illustrated in Figures 1-6 is a preferred embodiment of apparatus or machine which not only readily compresses the spring 40, but also aids in the rapid assembly of the device 10. The apparatus or machine 50 is mounted on a work stand generally indicated at 52, which is positioned in the usual manner adjacent an assembly system conveyor (not shown) that brings the elements to be assembled to the worker.

The apparatus or machine 50 comprises a cradle or yoke 54 rotatably supported at one end thereof by a fixed bracket 56 through an antifriction thrust bearing 58. The cradle or yoke 54 is rotatably supported at the other end thereof by a reciprocable power or pressure rod 60 connected by a suitable fitting 64 to a piston rod 61 extending from the cylinder 62. The piston rod 61 carries the usual piston head (not shown) on which the pressure in cylinder 62 acts to reciprocate rod 60. The rod 60 may have an intermediate support such as the bearing block 65 including an Alemite fitting 66. Screw-threadedly received on the rod 60 is an abutment disc 68 and outwardly of the disc 68, power or pressure head 70 is rotatably mounted on reduced end 71 of rod 60, antifriction thrust bearing 72 being interposed between the two, and suitable bearings being interposed between the rod 60 and the cradle or yoke 54 at 75, and between the head 70 and the rod 60 at 77 (see Figure 6). The pressure or power head 70 includes a pair of pusher prongs, studs, or lugs 73 for a purpose hereinafter made clear and the reduced end 71 of the rod 60 extends slightly outwardly of head 70 as shown, for instance, in Figure 1. The cradle or yoke 54 includes a curved support or carrier 74 fixed thereto which may take the form of a curved plate, a pair of shoulders or abutments 76 separated by a working space 78, and hand gripping and yoke strengthening bars 80 positioned on each side of the cradle or yoke. The cradle or yoke 54 may also include lugs 82 and 83 adapted to engage abutment 84 to prevent more than 180 degrees rotation of the cradle or yoke.

In operation, the elements of the device 10 are delivered to the worker on a suitable conveyor, and he places the friction shoes 24 loosely on the friction post 12 and the spring seat 42 is dropped over them. The spring 40 is then telescoped over the friction shoes and the sub-assembly positioned on the carrier 74 substantially as shown in Figures 1 and 2 with the base 14 of the friction post 12 adjacent the power or pressure head 70 and the slots 45 aligned with the studs 73. The worker pushes the sub-assembly to the left of Figures 1-4 until the studs 73 have passed through slots 45 to contact the spring seat 42; and then actuates the cylinder 62 to start the rod 60 and head 70 moving toward the right. The sub-assembly will then be moved to the right until the spring contacts the shoulders or abutments 76 and continued pressure from the cylinder will close the spring solid. This position is shown in Figures 5 and 6, and it is to be noted that the friction post 12 and friction shoes 24 remain within the spring 40 as the sub-assembly is moved to the right since the base of the friction post is in contact with the head 70, the outward projecting portion of end 71 registering in the recess of the post illustrated in Figure 8. Preferably the studs or lugs 73 are of a length and width that will permit relative movement between spring 40 and the friction post and shoes and between the friction post and said studs or lugs 73, as the sub-assembly is moved toward and into contact with the shoulders or abutments 76, whereby the upwardly projecting shoulders 22 drop away from the adjacent portion of the spring and the friction post will be inclined slightly downwardly with respect to the spring.

When the spring 40 is pressed solid, the inner ends of the friction shoes preferably extend slightly outwardly of the spring, to aid in positioning of the friction members 32, as shown at 86 in Figure 6, the corners of abutments or shoulders 76 fitting into, or close to, notches 49 thereof. The first friction member 32 is then positioned over the working space 78 as shown in Figure 6, and the cut-away portions of the flange 36 thereof at 47 allow the cylindrical body of the friction member to drop somewhat between the shoulders or abutments 76 to better align this element for insertion. The inwardly extending end of the friction member 32 is then moved to the left of Figure 6 and between the spring 40 and the upper friction shoe 24 until the lugs 38 thereof are positioned behind the corresponding shoulders 22 of the friction post 12. The cradle or yoke 54 is then rotated 180 degrees to position the spring unit for insertion of the second friction member whereupon the shoulders 22 adjacent the inserted friction member fall behind the lugs 38 of said member, said post then again being inclined downwardly, only now the other pair of shoulders project upwardly. This positioning of the post 12 upon turning of the cradle 180 degrees allows the second friction member 32 to be inserted in the same manner as the first. After the second friction member is correctly positioned with the lugs 38 thereof behind the corresponding shoulders 22 of the friction post 12, the cradle is returned to the original position, allowing the second set of shoulders 22 to drop behind the lugs 38 of the second friction member, and the cylinder pressure is released, whereupon the spring expands to dispose the friction post in a substantially level position and cause the lugs and shoulders of the friction members and the friction post to engage and lock the device in its assembled condition. The assembled unit 10 will then be removed by the worker and the apparatus is ready to receive the next sub-assembly.

Hand gripping bars 80 are provided to enable the worker to readily grip the cradle or yoke to expeditiously rotate same, and also strengthen the cradle thereby enabling it to better withstand the compressive forces applied to it; they may be omitted if so desired, however. The lugs 82, 83, and abutment 84 are useful in automatically positioning the yoke or cradle for rapid assembly work, but may be replaced by other indexing means as desired. The disclosed structures may include reinforcing webs and fastening or securing bolts as indicated diagrammatically or as found to be necessary.

This application is a division of my said application Serial Number 463,163.

The foregoing description and the drawings are given merely to explain and illustrate my invention, and the manner in which it may be performed, and the invention is not to be limited thereto, except insofar as the appended claim is so limited since those skilled in the art who have my disclosure before them will be able to make modifications and variations therein without departing from the scope of the invention.

I claim:

The method of assembling a cushioning unit of the type which includes a system of friction devices enclosed within a helical spring and which, when the unit is compressed by applying closing forces to both ends thereof, develops lateral friction forces within the system and against the internal surface of said spring, said friction system including a friction post having wedge surfaces thereon, a plurality of friction shoes having outwardly extending bottom flanges, said shoes being positioned around the post and having wedge surfaces cooperating with those on the friction post for developing lateral forces upon relative longitudinal movement between the post and said friction shoes, a spring seat telescopically mounted over said friction shoes and resting on said bottom flanges, and a plurality of friction members longitudinally spaced from said friction post and having locking shoulders interengageable with oppositely facing shoulders on said friction post for limiting longitudinal separation of the post and friction members, said friction members having outwardly extending top flanges with said helical spring extending between and bearing against said top flanges and said spring seat, respectively, said method comprising the steps of assembling the friction shoes on said post, applying the spring seat thereover, telescopically placing said helical spring over said post and shoes with the spring bearing against said spring seat, then compressing the spring by applying a closing force to both ends thereof while maintaining freedom of movement of said post and shoes, then applying said friction members while the spring is thus compressed and the friction system is inoperative to interengage said shoulders, and then releasing the spring to complete the assembled unit.

References Cited in the file of this patent

UNITED STATES PATENTS

| | | |
|---|---|---|
| 2,084,283 | Sproul | June 15, 1937 |
| 2,128,504 | Sproul | Aug. 30, 1938 |
| 2,505,564 | Meyer | Apr. 25, 1950 |
| 2,646,618 | Simons | July 28, 1953 |
| 2,789,811 | Campbell | Apr. 23, 1957 |